Aug. 16, 1938. W. H. HARTKE 2,126,882
AUTOMATIC TRAIN AND VEHICLE SERVICES COUPLER
Filed July 2, 1934 6 Sheets-Sheet 5
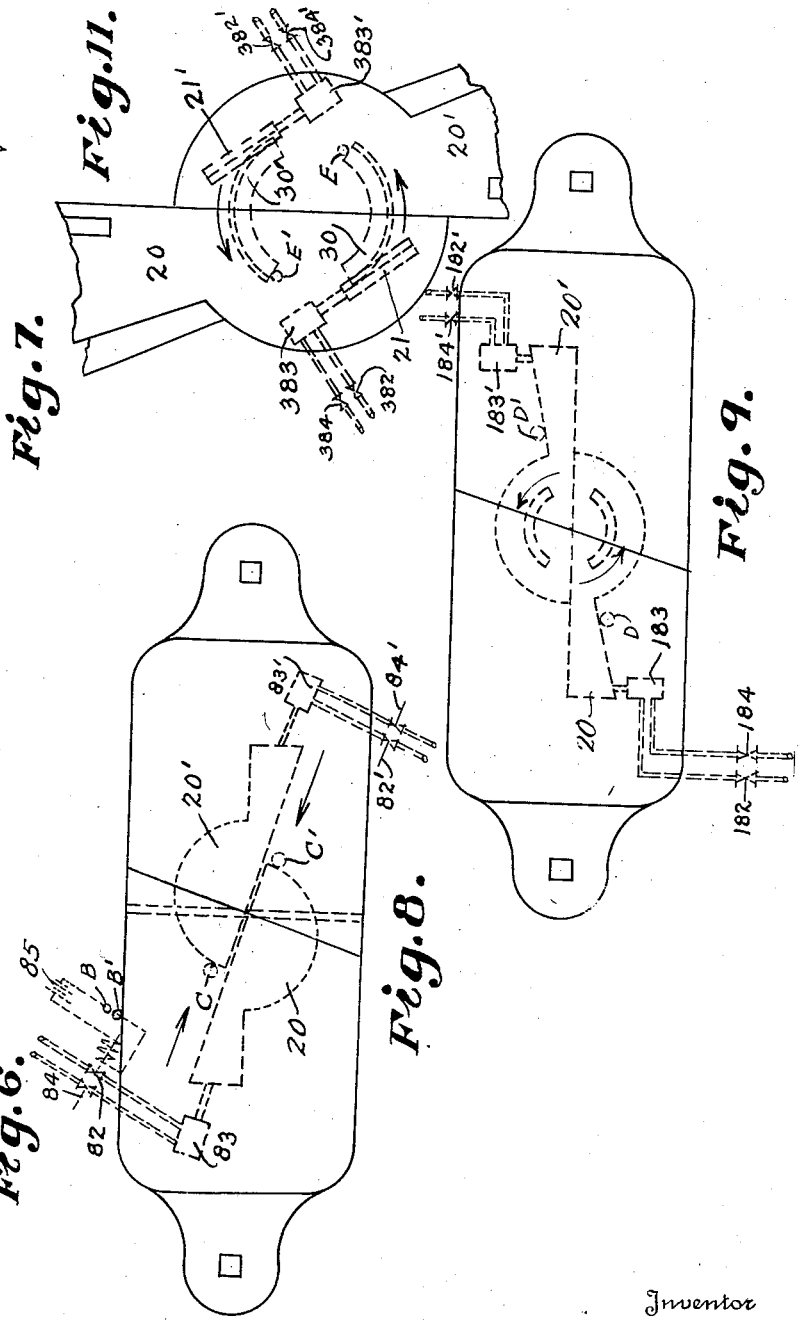
Inventor
WALTER H. HARTKE.
By Howard J. Whelan.
Attorney Aug. 16, 1938.   W. H. HARTKE   2,126,882
AUTOMATIC TRAIN AND VEHICLE SERVICES COUPLER
Filed July 2, 1934   6 Sheets-Sheet 6

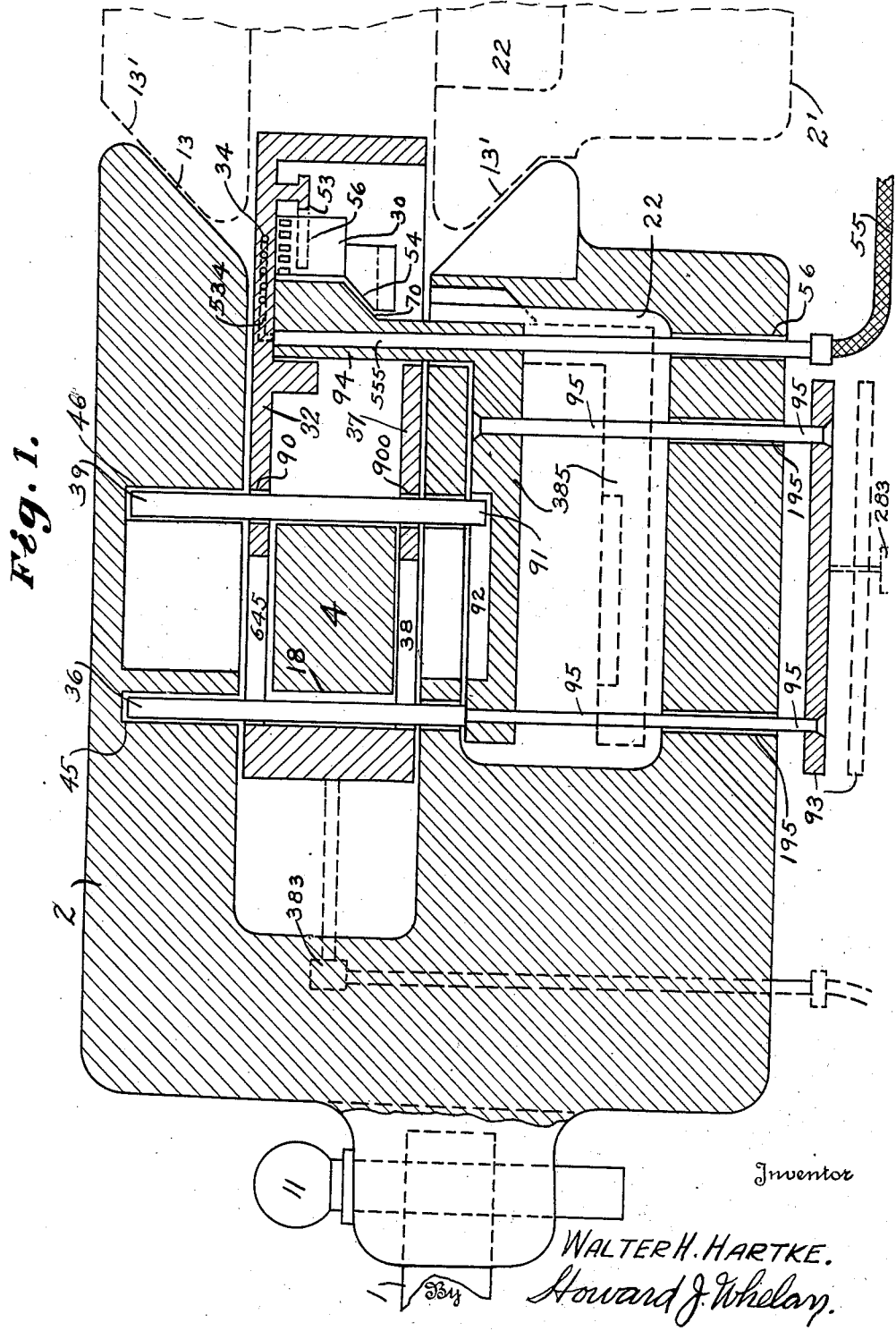

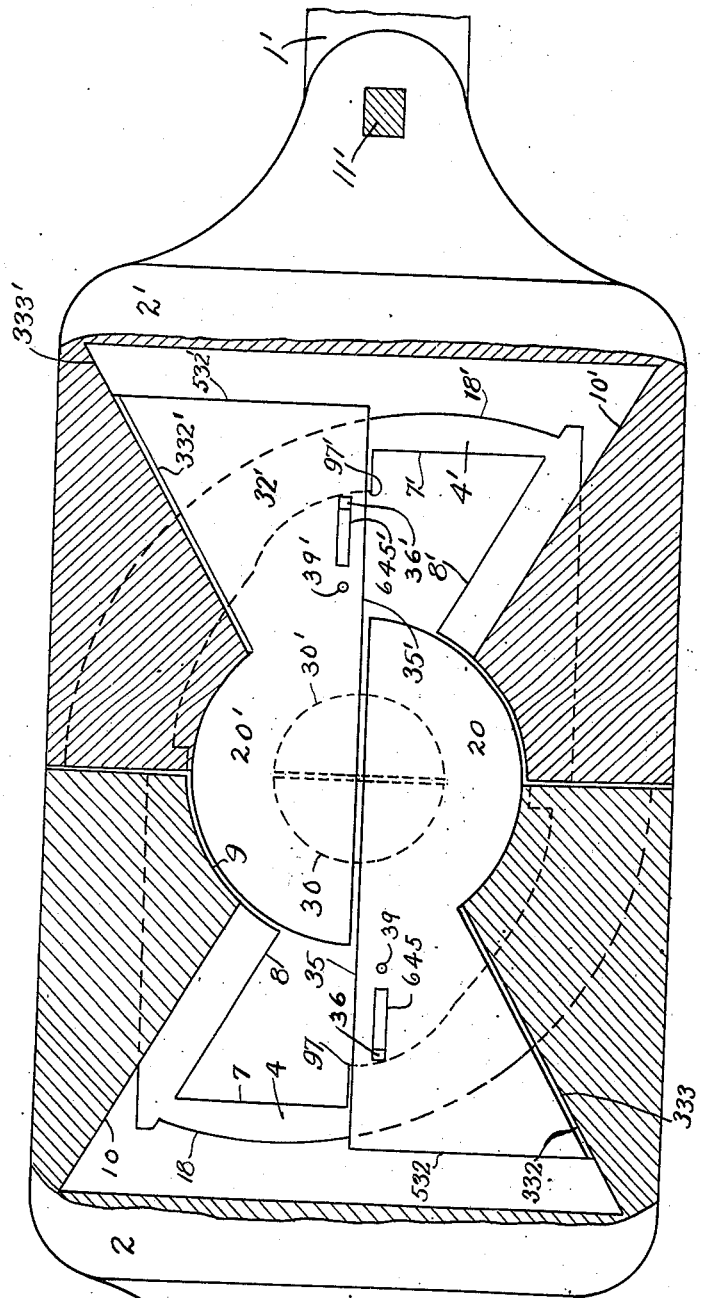

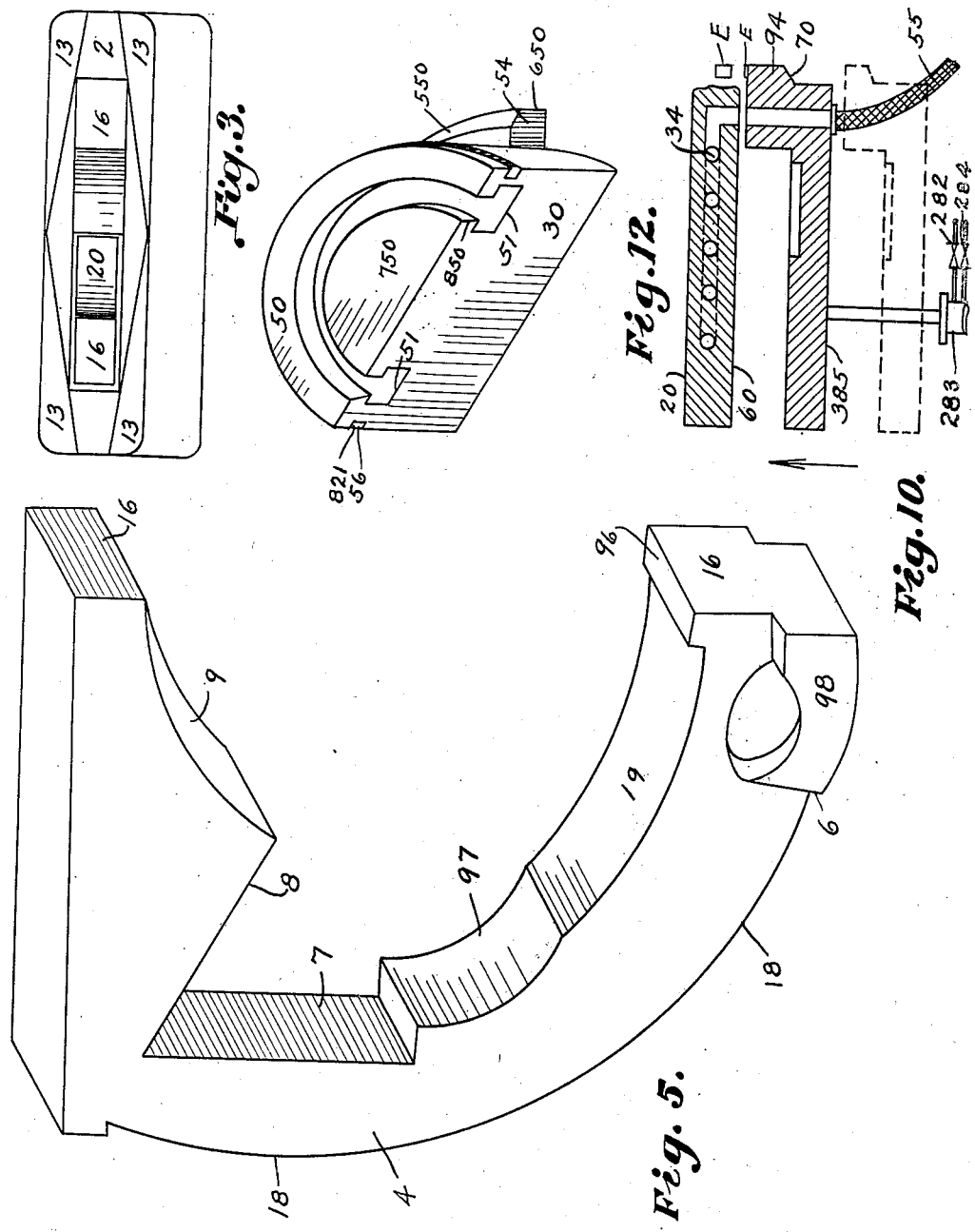

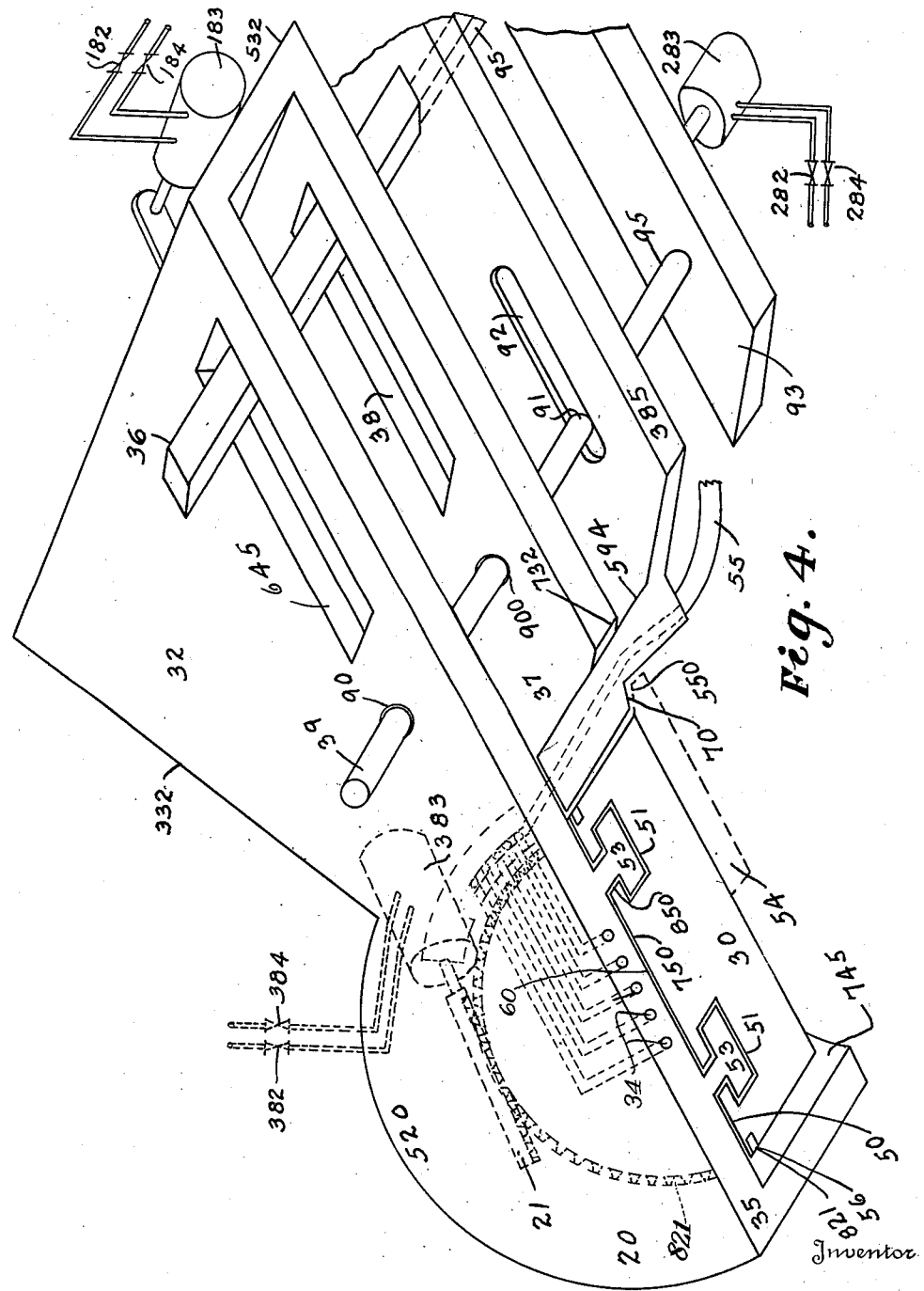

MOVES CLAW

TURNS CLAW

RAISES SERVICE COUPLER

TURNS INTERLOCK

OPERATES INDICATOR

Inventor
WALTER H. HARTKE.
By Howard J. Whelan.
Attorney

Patented Aug. 16, 1938

2,126,882

UNITED STATES PATENT OFFICE 2,126,882

AUTOMATIC TRAIN AND VEHICLE SERVICES COUPLER

Walter H. Hartke, Baltimore, Md.

Application July 2, 1934, Serial No. 733,491

8 Claims. (Cl. 213—76)

This invention refers to railroad rolling stock equipment and more particularly to devices for coupling the vehicle or train services together, operated under automotive or similar conditions; and has among its objects:

To provide arrangements for automatically joining the services in the train or vehicles together. Such services including air service; electric services of all kinds; water lines; gas lines and other features that might be desirable to have available in the circumstances;

To have self-aligning features enabling the coupler to adapt itself to variations in car heights, differences in grade, and other misalignments met with in practice;

To have auxiliary reservoirs of energy for actuating the parts that may be called into action at the failure of the primary source of energy for selectively moving the internal mechanism of the couplers;

To provide emergency facilities for communication throughout the train in case of accident;

To have means for controlling the operation of the service coupler from any determined point, and at such point to have an indicator for showing the condition of the services and any condition arising from accidental reactions;

And other objects that will become apparent as the invention is more fully set forth.

While couplers have been used for automatically tying cars, coaches and other parts of a train or vehicles together, such do not take care of the "services" connections between them. Such service connections are usually made by hand or manually, and require the services of a certain number of operators performing a number of operations. These "services" by reason of their bulk and low hanging looping, have to be limited in quantity, and thereby reduce the possible number of facilities that can be conveniently connected and used. In the invention, provision is made to reduce the bulk and confine the service lines to predetermined limitations, so they will not be in the way or liable to entangle. An automatic mechanism that will attach and detach the coupler with its services lines, positively and safely, is provided.

In the drawings, which illustrate an embodiment of this invention:

Figure 1 is a longitudinal section taken through a train service coupler embodying this invention, and indicates it in "coupled" position. This section is taken along line 1—1 of Figure 14 and at the lower portion of Figure 2.

Figure 2 is a broken-away plan view of the coupler member "coupled",

Figure 3 is an end view looking into the mouth of the coupler.

Figure 4 is a diagrammatic perspective view of a claw member used in the coupler with its interlock, raising mechanism and service connections, as indicated in Figure 2, Figure 5 is a perspective view of the eccentric guide used to control the claw member movement, and which is normally nested with the claw member in the shell of the coupler, Figure 6 is a diagrammatic view showing two couplers on adjacent cars, with arrows indicating the direction of movement for "coupling" together, Figure 7 indicates the couplers, at the moment of striking which is termed the first step in "coupling", Figure 8 indicates the movement of the claw members after the moment of striking, and is the second step in coupling, Figure 9 indicates the rotative or straightening-up movement of the claw members, and is the third step in the coupling.

Figure 13:
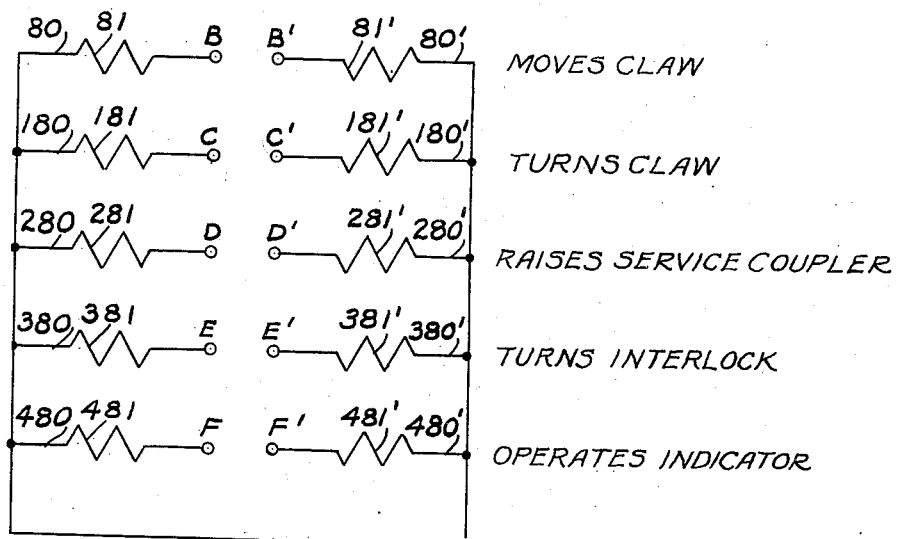
Figure 14:
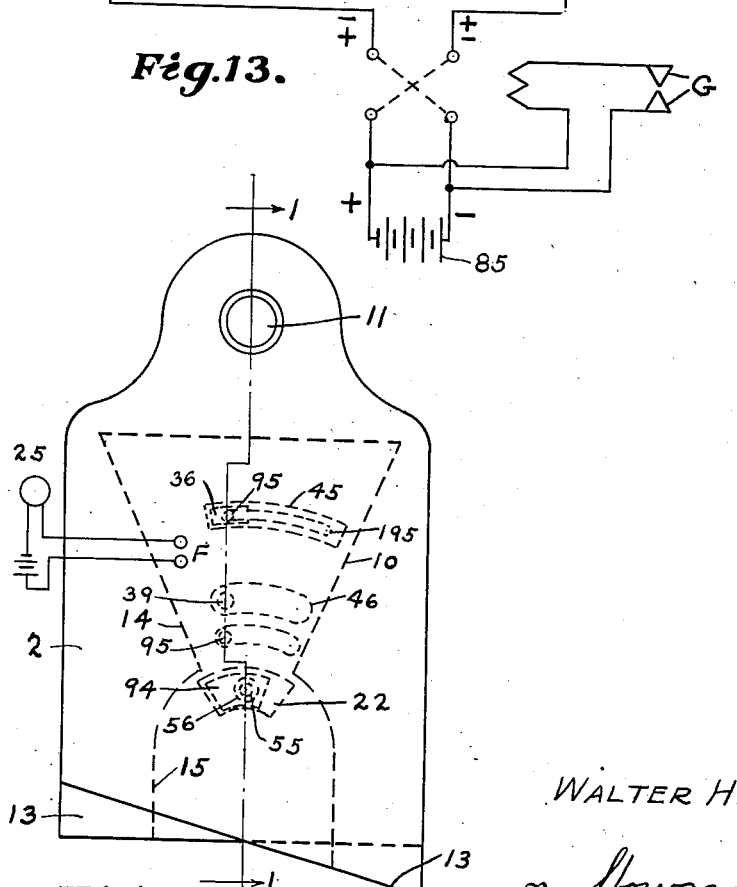

Figure 10 indicates the raising movement of the service connection to connect same through both couplers, and is the fourth step in coupling, Figure 11 is the process of locking the claw members and the couplers so they will not separate, and is the last step in coupling, Fig. 12 is a perspective detail of the interlock used in this invention, to lock the claw members together, Figure 13 is a diagrammatic layout of the electrical circuits for operating the parts of the couplers, and Figure 14 is a plan view of the coupler indicated in Figure 1.

Similar reference characters refer to similar parts throughout the drawings.

In the construction shown in the drawings, many parts are similar and symmetrical, due to the fact that two similar couplings connect with each. The function of coupling consists in joining two of the couplers together and parts of same that are similar. In order to facilitate the identification of the parts and avoid possibility of confusion in following the description, the numbering of similar parts of the two different couplers will be similar except that one of the couplers will have the prime mark (') connected with each of its reference numbers and the other will not.

Diagrams are provided to indicate the functional movements of the parts, where such will facilitate the description.

The action of the parts of the device during the coupling of two couplers is as follows: In the first place the couplers are attached to the front and rear of two railroad cars respectively by a draw bar 1, (and 1'). This draw bar keeps its coupler in position and transmits the pull exerted on the draw bar to its respective car or vehicle. As the railroad cars or vehicles are brought together, the service coupler of one comes into connection with the service coupler of the other. The bumpers 2 and 2' of the service couplers have their faces 13, 13' formed and designed to align themselves into one another ready for connection. These faces are bevelled as indicated for this purpose, to align vertically and horizontally with each other and thus direct the other parts to their respective channels. When the two couplers come together they operate an electric circuit 80, by closing a switch B, B'. When this circuit is closed, it actuates a suitable electrical device 81 like a solenoid magnetic control, that operates an air valve 82, that controls the flow of pressure air through a pipe or tube 882 to a piston cylinder 83 that operates its piston and piston rod to suitably move a claw member 20 to its forward slanting position. While this valve 82 is opened, the valve 84 on the other end of the stroke is closed. All general functions of this device are similar to those in a conventional piston cylinder. A conventional source of electricity for operating electrical circuits of this invention is shown at 85. The electrical energy or electricity is conducted through a circuit cable 55 feeding into the coupler it connects with, and the latter is bound up with other service connections, preferably to make a single combination line 55. The service connections attach to the bottom of the coupler and are carried through a hole or passage 56 as indicated in the drawings. It is well known in practice how to arrange the service connections as described so the construction of the same will not be extended, in the specification or drawings unduly. In fact, the construction will be confined to as few lines as possible to emphasize the operation and functions of the device more clearly, and lessen the confusion that might be created by too many lines in a limited space.

The claw member being moved in a slanting direction, reaches the end of its stroke and closes a circuit 180 by contacting the switch C which energizes the electrical device like the former one mentioned, and opens the valve 182, while closing the valve 184. This causes the piston in the cylinder 183 to operate and push the claw member into the position outlined in Figure 9 and aligned with the axis of the draw-bar. At the end of its stroke or travel, the claw member closes its switch at D and energizes the circuit 280, which it controls. This, in turn, operates the electrical device 281, similar in general to those already mentioned, causing the valve 282 to open and 284 to close making the piston and piston rod of the cylinder 283, move the platform 93, holder lifting plate 385 and service holder 94 into alignment. At the end of its stroke or travel the service coupler closes the switch E, and energizes the circuit 380 which it controls. This in turn operates the electrical device 381 similar in general to those already mentioned, causing the valve 382 to open and 384 to close, making the piston and piston rod of the cylinder 383 move the rack gear 21 in its forward stroke. This rack gear 21 is mounted on the claw member suitably and engages with pinion gear 821 on a lock mechanism 30, called an interlock.

The rack gear mechanism operates the pinion gear 821 of the interlock 30 and rotates the latter in the manner to be described and causes it to engage, wedge and lock in the T portion 53' adjacent of the claw member 20' on which it is guided. This brings both of the claw members into closer and more rigid connection. This interlock consists of a hemispherical member 30 provided with a rim element 50 at its top portion, having its exposed face, plane and smooth. A central hump 750 is arranged in the central portion of interlock as indicated and spaced away from the rim element 50 by the mouth 850 of an enlarged internal T-slot 51 situated below the hump 750. An external groove 56 with gearing teeth 821 is provided around the peripheral portion of the element 50 in a plane above that of the T-slot 51. At the lower and rear portion of the interlock body is formed a shelf 54, extended about one-half of the circumferential distance of the same and having a bevelled surface edge 550, leading to the vertical surface 650 from the horizontal surface 754 of the shelf, as outlined in Figure 12. This interlock is normally held in place on the claw member by means of downwardly pointing circular T-projections 53, which are attached to the under surface 60 of the upper portion of the claw member 20, and serve to provide a support and guide for the interlock by engaging its T-slot 51 as indicated in Figure 4. The interlock may be turned or slid around on these projections to any predetermined arcuate position thereon. The shelf on the interlock engages with a suitable projection surface 70, provided on the body of the service holding part 94, of the device, and serves to wedge same up tightly in place, when properly turned around. The limit of turning of the interlock is approximately from full faced position in the claw member, as shown in Figure 4, to half movement or 90 degrees beyond same. At the last position, it will engage in the adjacent coupler interlock and lock same to it. The adjacent coupler will likewise lock itself to the first mentioned. This means that the couplers will tie themselves together with their respective interlocks when properly actuated by their cylinders, piston rod and connecting rods and gearing mechanism, and bring their service connections into appropriate attachment through the couplers.

The claw member, in each case, is preferably made in the form indicated in the drawings, having a rounded or hemi-circular box 20 which has an upper surface 520 flat and extended into a fishtail form 32. In this portion of the claw member is provided a series of service pipes or conductors 34 terminating suitably at the face 35 of the member; also a radial slot 45 for permitting a control post 36 to enter and limit the movement of the claw member in its reciprocating travel; and a hole 90 for the guide pin 39 on which the claw member pivots. A hemi-circular wall 745 hangs down from upper portion in an open chamber form and surrounds the interlock. Its inner surface is smooth to permit the service holder 94 to slide easily along same, the rear surface 594 of the holder being faced to cooperate in this function. The inner surface of the holder has the ledge 70 under which the shelf of the interlock presses to position it. A wall 532 hangs down from the top fishtail plate 32, of the claw member. A lower plate 37 parallel to the top plate of 32 is held by the wall 532, and has a radial slot 38 corresponding and below the radial slot 645 and for like purposes. This lower plate also has a hole 900 corresponding with the hole 90 in the upper plate. The two slots 38 and 645 are preferably rectangular and intended to carry a squared post 36 and prevent same from rotating. The inner portion 732 of the lower plate is cut to guide the holder 94 into its proper position and where it will make aligned connection between its service connections 55 through the passages 555 with those 534 of the services 34 in the claw member. The holder has a lifting plate 385 formed on and extended at right angles from the portion 94, and is made symmetrical in contour with the lower fishtail plate 37. It has a slot 92 with straight sides and rounded end portions for the guidance of the post 39 which rests in it, and passes through the upper and lower plates 32, 4 and 37 respectively. The lifting plate is operated by a platform 93 mounted outside of the coupler shell 2, having its rigidly connected pins 95 extended through holes 195 in the shell to apply the necessary force to the lifting plate 385. One of these pins has an extension enlarged post 36 which passes through the claw member and terminates in a slot 45 provided in the upper portion of the shell on its interior side. This is shown in Figure 1. A conventional cylinder 383, with piston and connecting rods controlled by conductors with valves 382 and 384 serves as a means for raising the platform 93 and its parts, for operating the service holder. The post 39 on which the claw member pivots moves in a suitable slot 46 in the coupler shell. The services pass through a passage 56 provided in the lower portion of the shell 2 as indicated in Figure 1. The arrangements for providing energy and control of the various cylinders of the claw member is shown generally at 383.

The coupler is held to the draw bar 1 of the car or vehicle with a suitable means 11 in some conventional manner and serves to keep same properly positioned to suit its function.

Installed and fitted in the coupler shell and within the claw member in a convenient manner is a so-called eccentric member 4. This eccentric member is preferably formed as outlined in Figure 5, and has a straight face 16 which rests on a like corresponding surface in the service coupler of the adjacent car or vehicle, and serves to transmit the force of shocks from bumper to bumper as they strike each other. This relieves the stresses from the faces of the claw members and prevents the breaking of the service connections between the cars. The eccentric member has a general outline as indicated in Figure 5 with curved surfaces 97, 9 and 19 provided interiorly for engaging parts of the claw member mechanism, and an exterior curved surface 18, for engaging the inner surface of the fantail part 32. The post 36 rides on the surfaces 7 and 97. The eccentric member also has a projecting toe portion 96 that serves to hold the member in place in the shell, while the enlarged portion 98 is made to fit within recesses suitably provided for it. Its face 6, acts as a stop when the claw member 20 is in its service alignment coupling position. The side surfaces 4 of this eccentric member are planed flat and smooth to lessen its friction and eliminate any obstruction that might affect its easy operation. The circular curved surface 9 rubs up against the exterior hemi-spherical surface of the claw member 20, and the straight portion 8, against the straight edge 332 of the claw member adjacent the last mentioned surface.

The general operation of the couplers with each other is indicated diagrammatically in Figures 6, 7, 8, 9, 10, and 11. The vehicles A and A' with their respective draw-bars 1 and 1' are shown carrying their couplers 2 and 2', and advancing towards each other. As their bumper faces 13 and 13' meet, the latter wedge themselves, as it were and raise themselves to an adjusted proper level, instead of riding on each and forcing themselves out of alignment. These bumpers are, in other words, a self aligning means for bringing the couplers properly into position for the parts and mechanism of same to function suitably and effectively.

In the second step, which is indicated in Figure 8, each claw member advances slantingly towards and into the shell of the adjacent coupler until the members correspond symmetrically. The claw members then straighten up and align in the general direction of their axis. When faced properly, the interlocks come into play by rotating the rim element of one into the T-slot of the other. This action binds the claw members together and permits the service connections to be brought into attachment substantially.

However, these operations are brought about by the functioning of the mechanism of the parts and elements as follows: When the bumpers meet and adjust themselves into the right position, they cause an electrical circuit 80 and 81 to close, through the contacting of the switches B and B', and thereby open valves 82 and 82', which enables air under pressure to force the pistons, piston rods, connecting rods, etc. in the predetermined direction of travel to move the claw members as described and assume the first position. (See Figure 8.) The valves 84, 84' reverse the movement of travel, whenever that action is required for the detachment of the couplers.

After the parts are in the first position, the claw members bring the electrical circuit 180, 180' into action by closing the switches C, C' and through electrical devices 181, 181' opening the valves 182, 182' and enabling the cylinders 183, 183' to operate their pistons, piston rods and connecting rods, etc. and thereby rotate the claw members to a straight position with each other as shown in Figure 9. This action closes switches D, D' and energizes circuits 280, 280' and their devices 281, 281', operating the valves 282, 282' which causes cylinders 283, 283' with their incidental pistons, piston rods, connecting rods, etc. to raise the platform 93 with the service holders 94 attached to them bringing the services in their proper position for servicing through the couplers. This brings switches E, E' into contact and closes circuit 380, 380' and operates devices 381, 381' which in turn operates the valves 382, 382' and incidently cylinders 383, 383', with the pistons, piston rods, as well as rack gears 21, 21' and gearing 56, thereby turning interlocks into one another, locking them and their claw members together. After this, the electrical circuits 480, 481' are energized by the contacts F, F' closing, and the devices 482, 482' for operating the indicating signal arrangements 485 and 485' are moved to show that coupler action is completed. The service connections are now in feeding position. The valves operate the cylinders with their piston and piston rods, and connecting rods to bring this about. The reverse action for detaching the couplers is brought about by operating the valves 384, 384'; 284, 284', 184, 184' and 84, causing the respective pistons, rods and attachments to work on the return stroke of the travel, and return the interlock service holder and claw members to normal opening positions. When the service connections are made and properly connected, the service from them passes through the conductors through the shell to the vehicle branch circuits at 83. The claw members come into their final position as shown in Figure 2 with the backs 332, 332' of the plates 32, 32' against the surfaces 333, 333' in the bumper bodies 2, 2' where they remain set and the services connected.

The wiring is arranged so that any two bumpers of adjacent cars coming into contact, make complete circuit for the devices to operate as described.

For the purpose of providing a source of electricity, the generator or battery 85 is drawn diagrammatically in the drawings, and the various circuits shown at 80, 80'; 180, 180'; 280, 280'; 380, 380' and 480, 480' in Figure 4, while 81, 81'; 181, 181'; 281, 281'; 381, 381' and 481, 481' indicating the motors or devices for operating the respective valves.

It has been shown in the operation that the primary contact is made by the bumpers coming together, and the various steps pass in sequence as each prior step is completed, until the last step is reached. When the final step is reached, the services are connected and the vehicle ready to operate with them. The process of undoing the couplers, is a reversal of the action of the couplers, by shutting off the valves that operate in the first case, and turning on the valves to propel the pistons in the cylinder on the return stroke, until the final step is reached and the bumpers are separated from each other. The air is conducted to the cylinders through the piping 27. The reversal of the current and incidentally the equipment controlled thereby is brought about by the use of switches G as long as same is held by the operator, which remains in circuit until the bumpers separate and permit them to open and return the circuits to positions normal for reproducing the coupler actions desired and provided for, when the bumpers strike again.

The general principles of the operation have been described in the foregoing, but the rate of movement of the parts is quicker than might appear in the description, depending more on the pressure of the air and ease of making contacts than on the numerical quantity of the steps. Other constructions could be used, for it is intended not to limit this application other than required by the prior art, as it is appreciated that other forms might be made that would employ the same principles and come within the scope of the appended claims. Having thus described the invention, what is claimed is:—

1. In a coupler of the class described, the combination of a claw member, an eccentric member and a lifting plate, the claw member comprising a hollow hemi-cylindrical portion with a fishtail portion extending therefrom, said claw member having a linear and thence a rotative movement, an eccentric member arranged in the coupler and formed to set stationarily therein, and having portions constructed to guide the fishtail portion of the claw member in its linear movement, and a service holder mounted in the coupler and connected with the said lifting plate and adapted to operate within the said claw member and moveable from an inoperative position to an operable position in which its services are connected with service outlets in said claw member, and means for propelling the claw member and service holder through their respective movements.

2. In a coupler of the class described, the combination of a claw member, an eccentric member and a lifting plate, the claw member comprising a hollow hemi-cylindrical portion with a fishtail portion extending therefrom, said claw member having a linear and thence rotative movement, an eccentric member arranged in the coupler and formed to set stationarily therein, and having portions constructed to guide the fishtail portion of the claw member, in its linear movement, and a service holder mounted in the coupler adapted to operate within said claw member, a lifting platform for the service holder connected rigidly thereto and arranged exteriorly to the claw member, an eccentric member in the claw member, and means for propelling the claw member, service holder and parts through their respective movements.

3. In a coupler of the class described, the combination of a claw member, an eccentric member and a lifting plate, the claw member comprising a hollow hemi-cylindrical portion with a fishtail portion extending therefrom, said claw member having a linear and thence rotative movement, an eccentric member arranged in the coupler and formed to set stationarily therein, and having portions constructed to guide the fishtail portion of the claw member, in its linear movement, and a service holder mounted in the coupler adapted to operate within said claw member, a lifting platform for the service holder connected rigidly thereto and arranged exteriorly to the claw member, an eccentric member in the claw member, means for propelling the claw member, service holder and parts through their respective movements, an interlock attached to the claw member and rotatable therein with portions arranged for contacting the sevice holder and tightening same in position against the claw member, and means for operating the interlock.

4. In a coupler of the class described, the combination of a claw member having service connections therethrough, mounted in the coupler and operable therein, said claw member having one-half arranged in a hemi-cylindrical contour, the upper portion of which is flat and the lower portion pending down from same and hollowed, the other half being formed like a half fishtail extending radially from the first mentioned half portion, having upper and lower plate portions spaced from each other and held together by a pending side and having grooves for guiding and holding purposes, a guiding member connected with the coupler body actuating and positioned over said claw member with portions formed to fit the said halves and controlling the movement thereof, and a lifting platform for connecting service lines with said service connections in the same claw member, mounted exteriorly to the coupler and securely connecting with the claw member, and means for operating the claw member, guiding member and lifting platform from an inoperative position to an operative position in which the service lines are connected with outlets in the claw member.

5. An automatic coupler of the class described comprising in combination, a bumper section arranged for vehicle connection and having a plurality of faces bevelled for aligning purposes, arranged in its front portion, an eccentric guide member disposed and floating in said bumper section, a claw member mounted on said eccentric member and adapted to be operatively guided in linear and thence rotative movements thereby, a movable platform disposed adjacent to the said claw member, a plurality of service conductors in said claw member, a holder attached to and operated by the movable platform for moving said service conductors from inoperative position to predetermined service connection outlets and operative position in the claw member, means for interlocking the claw member with that of an adjacent coupler, and means for propelling the actuating members and parts of the coupler aforesaid.

6. An automatic coupler of the class described comprising in combination, a bumper section arranged for vehicle connection and having a plurality of faces bevelled for aligning purposes, arranged in its front portion, an eccentric guide member disposed and floating in said bumper section, a claw member mounted on said eccentric member and adapted to be operatively guided in linear and rotative movements thereby, a movable platform disposed adjacent and attached to the said claw member, a plurality of service conductors movable in said claw member, a holder operated by the movable platform for moving said service conductors from inoperative position to predetermined service connection outlets in the claw member, means for interlocking the claw member with that of an adjacent coupler, means for propelling the actuating parts of the coupler as aforesaid, and a shelf on said interlocking means adapted to engage with said holder and force same tightly into predetermined position for locking the service conductors and connections in operative position.

7. In a coupler of the class described, a shell having bevelled bumper portions for adjusting the relative position of the same, said shell having internal chambers and slots and service conducting means therein, a claw member in the shell having services conductors connected with said means and operable within the chambers thereof, an eccentric member engaged within the claw member having its faces coacting with faces of the claw member for taking up the displacement shocks thereof, and a service holding member disposed within the shell and adjacent to the claw member having the service conductors attached thereto and aligned with the service conductors in the claw member and adapted to join therewith, and means for operating the claw member, eccentric member and service holder in sequence from inoperative to operative positions.

8. In a coupler of the class described, a shell having bevelled bumper portions for adjusting the relative position of the same, said shell having internal chambers and slots and service conducting means therein, a claw member in the shell having services conductors therein connected with said means and operable within the chambers thereof, an eccentric member engaged within the claw member having its faces coacting with faces of the claw member for taking up the displacement shocks thereof, and a service holding member disposed within the shell and adjacent to the claw member having the service conductors attached thereto and aligned with the service conductors outlets in the claw member and adapted to join therewith, and means for operating the claw member from inoperative to operative position, eccentric member and service holder in sequence cooperatively, and an interlock mounted within the claw member for locking the claw member in operative position.

WALTER H. HARTKE.